United States Patent [19]
Fushiya et al.

[11] Patent Number: 4,962,588
[45] Date of Patent: Oct. 16, 1990

[54] PORTABLE RECIPROCATING SAW

[75] Inventors: Fusao Fushiya; Takashi Yamazaki; Mitsuyoshi Shibata, all of Anjo, Japan

[73] Assignee: Makita Electric Works, Ltd., Anjo, Japan

[21] Appl. No.: 334,531

[22] Filed: Apr. 7, 1989

[30] Foreign Application Priority Data

Apr. 11, 1988 [JP] Japan .................................. 63-48449
Mar. 4, 1989 [JP] Japan ................................... 1-24895

[51] Int. Cl.⁵ ............................................ B27B 11/00
[52] U.S. Cl. ......................................... 30/372; 30/393
[58] Field of Search ............. 30/392, 393, 372, 166 A, 30/378, 394

[56] References Cited

U.S. PATENT DOCUMENTS 4,385,443  5/1983  O'Banion .............................. 30/393
4,676,001  6/1987  Wagner ................................. 30/393

FOREIGN PATENT DOCUMENTS

57-183104  11/1982  Japan .
57-185502  11/1982  Japan .

Primary Examiner—Douglas D. Watts
Attorney, Agent, or Firm—Dennison, Meserole, Pollack & Scheiner

[57] ABSTRACT

A portable reciprocating saw includes a tool housing, an electric motor enclosed in the tool housing and having an output shaft, an elongated slider for supporting a saw blade, and motion converting means mounted in the tool housing for converting the rotation from the electric motor into a reciprocating motion of the slider in longitudinal direction. The motion converting means includes a bevel gear meshing with the ouptut shaft of the electric motor and rotatable about an axis inclined to a plane transverse to the longitudinal direction of the slider, a slider block mounted on the slider and having a guide groove formed on a lower surface thereof in a direction transverse to the longitudinal direction of the slider, and an eccentric pin mounted on the bevel gear at a position eccentric from the center of the bevel gear and loosely fitted in the guide groove of the slider block. With this arrangement, during operation of the electric motor, the slider performs a composite orbital motion including a reciprocating motion in longitudinal direction and a pivotal motion about a pivot axis extending transverse to the longitudinal direction.

12 Claims, 7 Drawing Sheets

PORTABLE RECIPROCATING SAW

BACKGROUND OF THE INVENTION

1. Field of the Invention

The present invention relates to a portable reciprocating saw having a saw blade which performs an orbital motion in which a first path during forward travel is different from a second path during return travel.

2. Description of the Prior Art

In a conventional Portable reciprocating saw of this type, rotation from the drive motor is converted into a reciprocating motion, which is transmitted to a slider carrying a saw blade. Thus, the slider is reciprocatingly moved to perform a cutting operation. Furthermore, in order to improve the efficiency of operation, the reciprocating motion of the slider is combined with a pivotal motion so as to impart an orbital motion to the slider or the saw blade.

Various mechanisms and arrangements have been devised heretofore to impart such an orbital motion in a reciprocating saw. For example, Japanese Laid-Open Utility Model Publication Nos. 57-183105 and 57-185502 disclose such an arrangement in which means for converting rotation from a drive motor into a reciprocating motion to be transmitted to a slider includes cam means so as to impart to the slider a pivotal motion in association with the reciprocating motion. U.S. Pat. No. 4,385,443 discloses another arrangement in which a bevel gear serving as motion converting means has its axis inclined to a plane transverse to the axis of reciprocation of the slider so as to impart to the slider a pivotal motion in association with the reciprocating motion However, the former arrangement of the above mentioned prior art is disadvantageous in that provision of the cam means inevitably causes the structure to be complicated In the latter arrangement, the noted cam means is omitted by inclining the bevel gear However, as the axis of the bevel gear is inclined only to a plane transverse to the axis of reciprocation of the slider, the arrangement cannot impart the above mentioned orbital motion but an arcuate motion having a forward travel and a return travel in a common path. Therefore, suitable connecting means different from the above mentioned cam means must be provided at the connection between the bevel gear and the slider. This disadvantageously causes the arrangement to be complicated.

SUMMARY OF THE INVENTION

It is an object of the present invention to provide a portable reciprocating saw which avoids the noted disadvantages of the prior art device.

It is a further object of the present invention to provide a portable reciprocating saw in which the means for imparting a composite orbital motion to a saw blade is of relatively simple construction so that the saw may be manufactured at lower cost.

According to the present invention, there is provided a portable reciprocating saw which comprises a tool housing, an electric motor enclosed in the tool housing and having an output shaft, an elongated slider for supporting a saw blade, and motion converting means mounted in the tool housing for converting the rotation from the electric motor into a reciprocating motion of the slider in longitudinal direction The motion converting means includes a bevel gear meshing with the output shaft of the electric motor and rotatable about an axis inclined to a plane transverse to the longitudinal direction of the slider, a slider block mounted on the slider and having a guide groove formed on a lower surface thereof in a direction transverse to the longitudinal direction of the slider, and an eccentric pin mounted on the bevel gear at a position eccentric from the center of the bevel gear and loosely fitted in the guide groove of the slider block. With this arrangement, during operation of the electric motor, the slider performs a composite orbital motion including a reciprocating motion in longitudinal direction and a pivotal motion about a pivot axis extending transverse to the longitudinal direction.

The invention will become more fully apparent from the claims and the description as it proceeds in connection with the drawings.

DETAILED DESCRIPTION OF THE PREFERRED EMBODIMENTS

Figure 1:
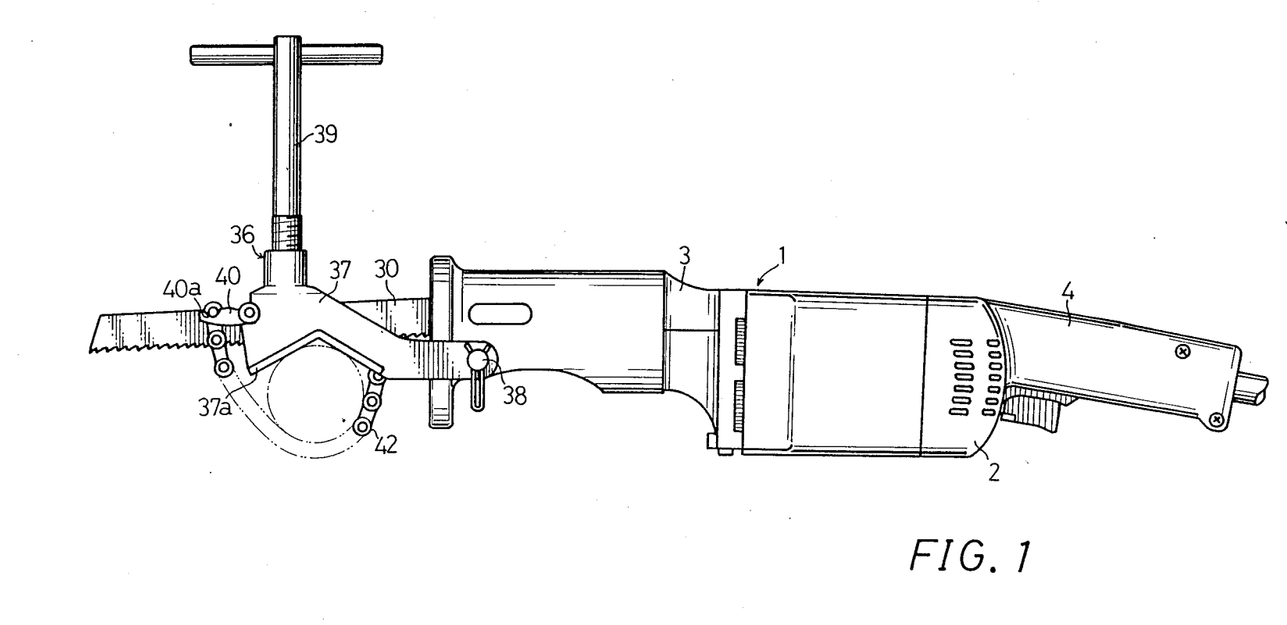
FIG 1 is a side view of a Portable reciprocating saw according to a first embodiment of the invention.
Figure 2:
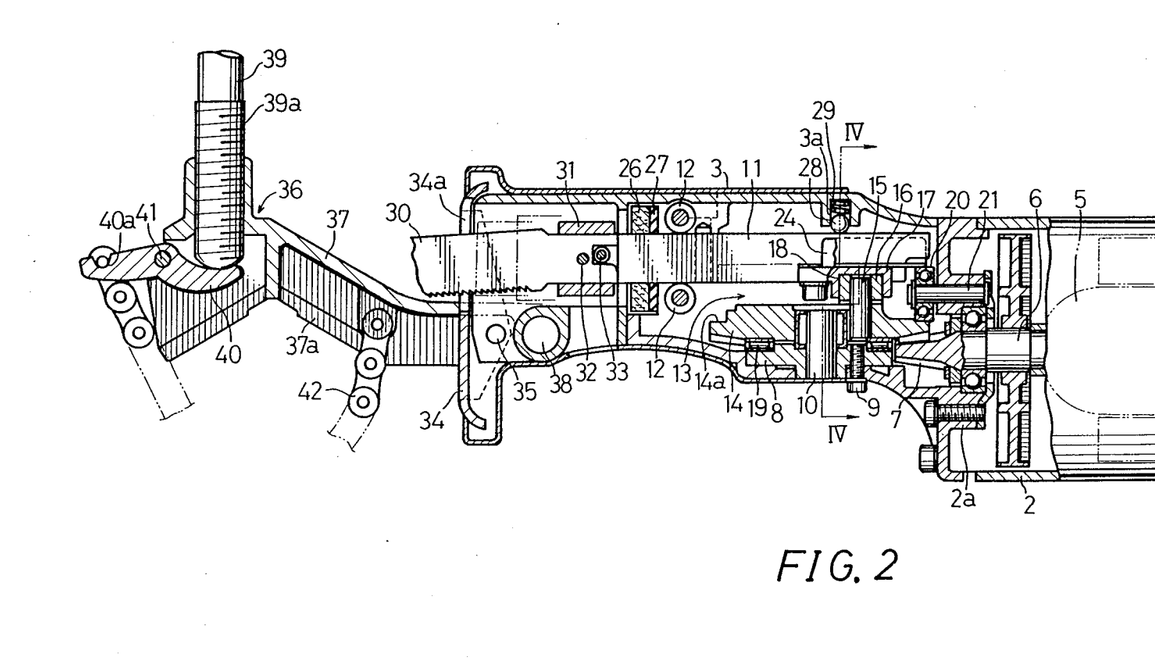
FIG. 2 is a partly sectioned side view, on an enlarged scale, of the essential parts of the saw in FIG. 1.

Referring now to the drawings, and more particularly to FIGS. 1 and 2, there is shown a portable reciprocating saw 1 according to a first embodiment of the present invention. As shown therein, the portable reciprocating saw 1 includes a motor housing 2, a tool housing 3 integrally formed with and extending forwardly from the motor housing 2, and a handle 4 extending rearwardly from the motor housing 2.

An electric motor 5 is enclosed in the motor housing 2 and has an output shaft 6 rotatably supported by a bearing housing 2a through a bearing and projected toward the lower portion of the tool housing 3. The output shaft 6 has a bevel gear 7 formed at the free end thereof.

A disc-like gear-shaft holder 8 is provided in the lower portion of the tool housing 3, having a boss fitted therein The holder 8 is fixed to the tool housing 3 by a retaining screw 9. A gear shaft 10 having a flange is fitted in the holder 8, extending upwardly from the center of the top face of the holder 8.

A slider 11 in the form of a square bar is provided in the upper portion of the tool housing 3 and extends axially or longitudinally of the latter. The slider 11 has a front end positioned substantially at the front end of the tool housing 3, a rear end positioned substantially at the rear end of the tool housing 3, and a medial portion held at its upper and lower surfaces in engagement between a pair of first guide rollers 12 supported substantially at the medial portion of the tool housing 3, so that a reciprocating motion of the slider 11 in the axial or longitudinal direction may be guided therebetween. The guide rollers 12 form the fulcrums of vertical or pivotal motion of the slider 11 as will be mentioned later.

Figure 3:
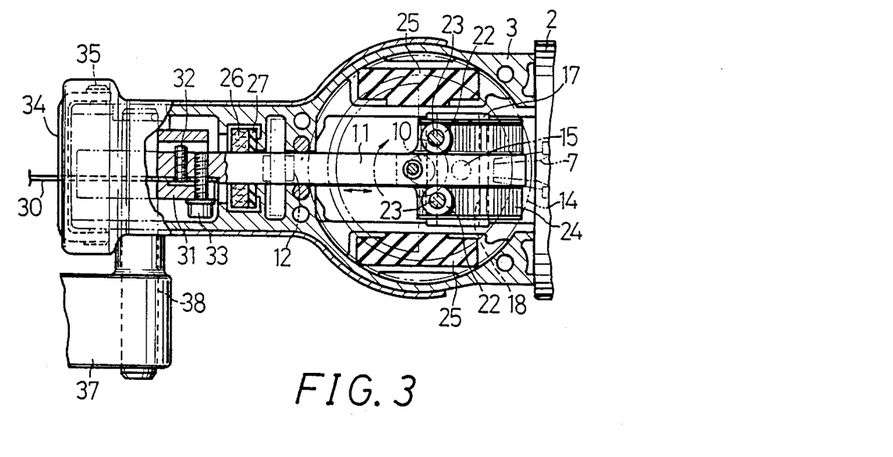
FIG. 3 is a partially sectioned top view, on an enlarged scale, of the essential parts of the saw in FIG. 1.
Figure 4:
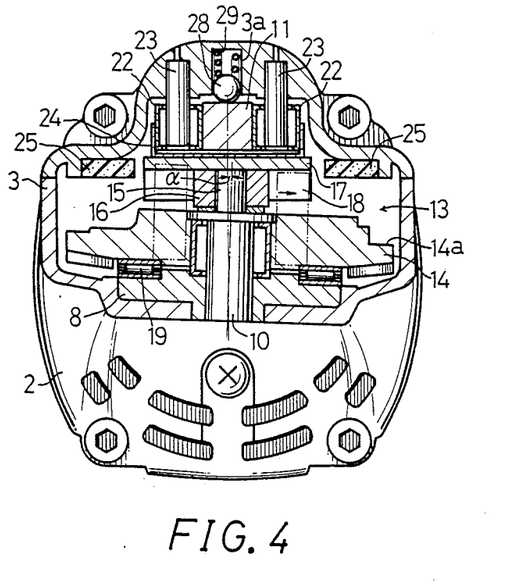
FIG. 4 is an enlarged sectional view taken along line IV—IV in FIG. 2.

Motion converting means 13 is provided between the output shaft 6 of the electric motor 5 and is adapted to convert rotation from the electric motor 5 into a reciprocating motion of the slider 11. Specifically, as shown in FIGS. 2 to 4, the motion converting means 13 includes a bevel gear 14, an eccentric pin 15, a square bearing metal 16, and a slider block 17. The bevel gear 14 is rotatably supported on the holder 8 by the gear shaft 10 through a bearing and has a lower surface meshing with the bevel gear 7 of the output shaft 6. The eccentric pin 15 extends upwardly from an upper surface of the bevel gear 14 at a position radially eccentric by a predetermined distance from the gear shaft 10. The square bearing metal 16 is fitted on the eccentric pin 15 through a washer. The slider block 17 is fitted in a groove formed on a lower surface of the rear portion of the slider 11 in a direction transverse to the longitudinal direction of the slider 11 and is fixed by a bolt. The slider block 17 has a guide groove 18 formed on the lower surface thereof and extending therethrough in a direction transverse to the longitudinal direction of the slider 11.

As best shown in FIG. 4, the gear shaft 10 forming the center of rotation of the bevel gear 14 is inclined at an angle $\alpha$ to a plane transverse to the longitudinal direction of the slider 11, so that the bevel gear 14 is disposed in opposing relation to the holder 8 at the inclination angle $\alpha$ to the plane transverse to the longitudinal direction of the slider 11. The bevel gear 14 has a sectional shape in which the front portion is different in thickness from the rear portion, so that during rotation, the weight of the bevel gear 14 may be balanced. The eccentric pin 15 is located such that when the bevel gear 14 is in its inclined position shown in FIG. 4, the eccentric pin 15 may be substantially at the medial portion of the guide groove 18 of the slider block 17 and directly behind the gear shaft 10 of the bevel gear 14, as shown in FIGS. 3 and 4. The square bearing metal 16 is slidably received in the guide groove 18 of the slider block 17 and has an upper surface tapered to suit the inclination angle of the bevel gear 14, so that the upper surface of the bearing metal 16 may be held in flat sliding contact with the bottom surface of the guide groove 18.

Turning now to FIG. 2, a thrust bearing 19 is interposed between the lower surface of the bevel gear 14 and the holder 8, and a hold-down bearing 20 is supported by the bearing housing 2a through a support shaft 21 so as to be rotated in engagement with a peripheral stepped portion 14a formed in the upper surface of the bevel gear 14.

With this arrangement of the motion converting means 13, the bevel gear 14 is rotated at the inclination angle $\alpha$ to the plane transverse to the longitudinal direction of the slider 11 through the output shaft 6 of the electric motor 5 about the gear shaft 10 inclined at the angle $\alpha$ to the plane transverse to the longitudinal direction of the slider 11. This causes the eccentric pin 15 to be reciprocated through the square bearing metal 16 within the guide groove 18 of the slider block 17 so as to impart an axially or longitudinally reciprocating motion to the slider 11. During the reciprocating motion of the slider 11, the eccentric pin 15 along with the square bearing metal 16 is vertically moved by means of the inclined bevel gear 14 and reaches its uppermost and lowermost positions substantially at the opposite ends of the guide groove 18 of the slider block 17 corresponding to the intermediate positions of the forward and return travels of the reciprocating motion. This causes the slider 11 to be vertically pivoted in seesaw motion about the fulcrums of the guide rollers 12 so as to impart a pivotal motion in connection with the reciprocating motion to the front end of the slider 11. In other words, each rotation of the bevel gear 14 results in a reciprocation of the eccentric pin 15 and the square bearing metal 16 within the guide groove 18 of the slider block 17 so as to impart a cycle of orbital motion to the slider 11.

As shown in FIGS. 3 and 4, in the rear portion of the tool housing 3, the lateral sides of the slider 11 are held in engagement between a pair of second guide rollers 22 supported by support shafts 23 extending downwardly substantially from the rear end of the tool housing 3, so that an axially or longitudinally reciprocating motion and a pivotal motion of the slider 11 may be guided by the guide rollers 22. Each of the guide rollers 22 is held at its outside remote from the slider 11 by a bearing support 24 having a channel-like section and interposed between the recess of the slider 11 and the slider block 17.

A pair of first lubricant supply members 25, such as, of sponge impregnated with lubricant are disposed each on either side of the slider block 17 in opposing relation to each other and are engageable with the square bearing metal 16. A second lubricant supply member 26, such as, of felt impregnated with lubricant and a rubber plate 27 for preventing entry of dust into the tool housing 3 are provided substantially in the central portion of the tool housing 3 before the first guide rollers 12 in such a manner as to encircle the slider 11.

The tool housing 3 is formed with a recess 3a in opposing relation to the rear end of the slider 11. A guide ball 28 is received in the recess 3a and urged by a spring 29, so that a half of the guide ball 28 may be projected downwardly and held in abutment against the upper surface of the rear end of the slider 11 to normally urge the rear end of the slider 11 downwardly.

As shown in FIG. 2, a saw blade 30 is detachably fastened to the front end of the slider 11 by a substantially D-shaped clamp block 31, a positioning screw 32 and a retaining bolt 33. The saw blade 30 is projected forwardly through an opening 34a of a shoe 34 having a lower portion tiltably attached to the front end of the tool housing 3 by a pin 35.

A vice mechanism 36 is mounted on the front end of the tool housing 3. Specifically, as shown in FIGS. 1 to 3, the vice mechanism 36 includes a body 37, a handle 39, a clamp lever 40, and a clamp band 42. The body 37 is supported at the rear end thereof by a support shaft 38 of the tool housing 3 and extends parallel to the saw blade 30. The body 37 is formed on the lower surface of the front end thereof with a substantially inverted V-shaped clamp surface 37a. The handle 39 has a threaded stem 39a which is threadedly engaged with an upper portion of the body 37. The clamp lever 40 has a medial portion pivotally supported by a pivot pin 41, one end engageable with the lower surface of the threaded stem 39a of the handle 39 and the other end having an engaging recess 40a. The clamp band 42 is a chain-like member having one end attached to the body 37. A workpiece can be held between the clamp surface 37a of the body 37 and the clamp band 42 so as to be disposed perpendicular to the saw blade 30. Then, the clamp band 42 is engaged with the engaging recess 40a of the clamp lever 40, and the handle 39 is turned to threadedly moved downwardly, so that the clamp lever 40 may be pivoted to tighten up the clamp band 4Z. Thus, the workpiece can be retained fixedly The portable reciprocating saw described above is operated as follows.

Initially, the electric motor 5 is driven to rotate the output shaft 6. This causes the bevel gear 14, which is meshed with the output shaft 6 through the bevel gear 7, to be rotated at the inclination angle $\alpha$ to the plane transverse to the longitudinal direction of the slider 11 about the gear shaft 10 inclined at the angle $\alpha$ to the plane transverse to the longitudinal direction of the slider 11. At the same time, the eccentric pin 15 is also rotated about the gear shaft 10. As the eccentric pin 15 along with the square bearing metal 16 is fitted within the guide groove 18 of the slider block 17, the rotation of the eccentric pin 15 about the gear shaft 10 results in a reciprocating motion thereof within the guide groove 18. Thus, the eccentric pin 15 and the square bearing metal 16 impart an axially or longitudinally reciprocating motion to the slider 11. During the reciprocating motion of the slider 11, the eccentric pin 15 and the square bearing metal 16 are vertically moved due to inclination of the bevel gear 14 and reach the uppermost and lowermost positions substantially at the opposite ends of the guide groove 18 of the slider block 17 corresponding to the intermediate positions of the forward and return travels of the reciprocating motion. This causes the slider 11 to be vertically pivoted in seesaw motion about the fulcrums of the first guide rollers 12.

More specifically, when the slider 11 is positioned at the rearmost end of the return travel as shown in FIGS. 2 to 4, the eccentric pin 15 is directly behind the gear shaft 10 of the bevel gear 14 and also located along with the square bearing metal 16 substantially at the medial portion of the guide groove 18 of the slider block 17. When the bevel gear 14 is rotated 90° in the clockwise direction as viewed in FIG. 3, the eccentric pin 15 and the square bearing metal 16 are slidingly moved to the right (as viewed in FIG. 4) in the guide groove 18 of the slider block 17, until they reach the right end of the guide groove 18. As the bevel gear 14 is further rotated 90°, the eccentric pin 15 and the square bearing metal 16 are moved to the left to the medial portion of the guide groove 18. During this sliding movement of the eccentric pin 15 and the square bearing metal 16, the slider 11 is moved forward or advanced to the foremost end of the forward travel, and the eccentric pin 15 and the square bearing metal 16 are gradually displaced downward along with the guide groove 18 of the slider block 17, until they reach the lowermost position, and then they are gradually displaced upward. This displacement causes the rear end of the slider 11 to be gradually pivoted downward about the fulcrums of the guide rollers 12, until it reaches the lowermost position, and then it is pivoted upward. On the contrary, the front end of the slider 11 to which the saw blade 30 is attached is gradually pivoted upward, until it reaches the uppermost position, and then it is pivoted downward. Therefore, the slider 11 is advanced or moved forward in such a manner that the saw blade 30 may travel in a path of downwardly open arc.

Thereafter, when the bevel gear 14 is further rotated 90°, the eccentric pin 15 and the square bearing metal 16 are slidingly moved to the left in the guide groove 18 of the slider block 17 as viewed in FIG. 4, until they reach the left end of the guide groove 18. As the bevel gear 14 is further rotated 90°, the eccentric pin 15 and the square bearing metal 16 are slidingly moved to the right to the medial portion of the guide groove 18. During this sliding movement of the eccentric pin 15 and the square bearing metal 16, the slider 11 is moved backward or reversed to the rearmost end of the return travel, and the eccentric pin 15 and the square bearing metal 16 are gradually displaced upward along with the guide groove 18 of the slider block 17, until they reach the uppermost position, and then they are displaced downward. This displacement causes the rear end of the slider 11 to be gradually pivoted upward about the fulcrums of the guide rollers 12, until it reaches the uppermost position, and then it is pivoted downward. On the contrary, the front end of the slider 11 to which the saw blade 30 is attached is gradually pivoted downward, until it reaches the lowermost position, and then it is pivoted upward. Therefore, the slider 11 is moved backward or reversed in such a manner that the saw blade 30 may travel in a path of upwardly open arc.

Thus, each rotation of the bevel gear 14 causes a reciprocating motion of the eccentric pin 15 and the square bearing metal 16 within the guide groove 18 of the slider block 17 which imparts to the slider 11 or the saw blade 30 a cycle of orbital motion including an arcuate motion in a path for the forward travel and an arcuate motion in a different path for the return travel. As the bevel gear 14 is rotated, this motion is continuously effected to perform a cutting operation by the saw blade 30.

In the devIce of the present invention, the first lubricant supply members 25 are disposed so that, during the sliding motion of the eccentric pin 15 and the square bearing metal 16 within the guide groove 18 of the slider block 17, they may come in contact with the square bearing metal 16 at the corresponding ends of the sliding motion. This ensures the square hearing metal 16 to be constantly lubricated by the first lubricant supply members 25, permitting smooth sliding motion thereof within the guide groove 18. The slider 11 is held in contact with the second lubricant supply member 25 to be constantly lubricated thereby. This assures the slider 11 to be smoothly slided between the first guide rollers 12 and the second guide rollers 22. Furthermore, provision of the rubber plate 27 effectively prevents entry of dust into the tool housing 3.

As the rear end of the slider 11 is normally pressed downward by the guide ball 28 urged by the spring 29, the slider can positively follow the vertical displacement of the eccentric pin 15 and the square bearing metal 16.

FIGS. 5 to 8 show a second embodiment of the invention which has two significant differences from the first embodiment previously described. One difference in the second embodiment is that an additional lubricant supply means is provided for positively supplying lubricant to the eccentric pin 15, the square bearing metal 16 and the slider block 17. The other difference in the second embodiment is that a modified vice mechanism 55 is provided corresponding to the vice mechanism 36 of the first embodiment but having a different arrangement to mount the clamp band 42. Parts that are the same as those in FIGS. 1 to 4 are given like reference numbers and their description will not be repeated.

Figure 5:
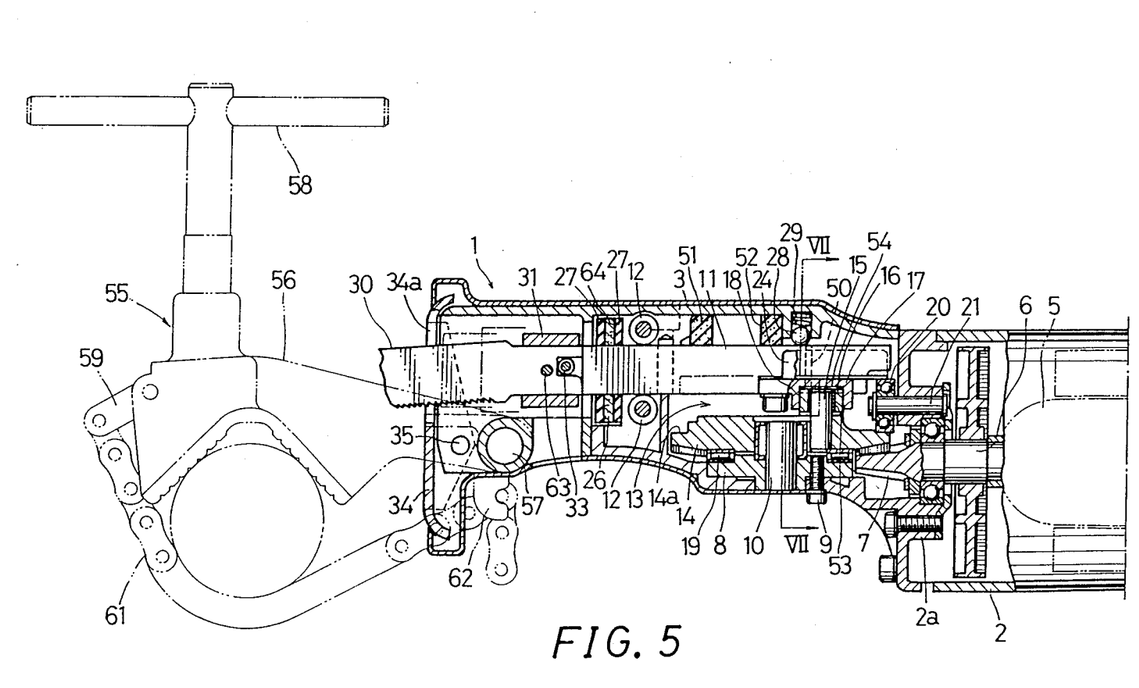
FIG. 5 is a partly sectioned side view of the essential parts of a portable reciprocating saw according to a second embodiment of the invention.
Figure 6:
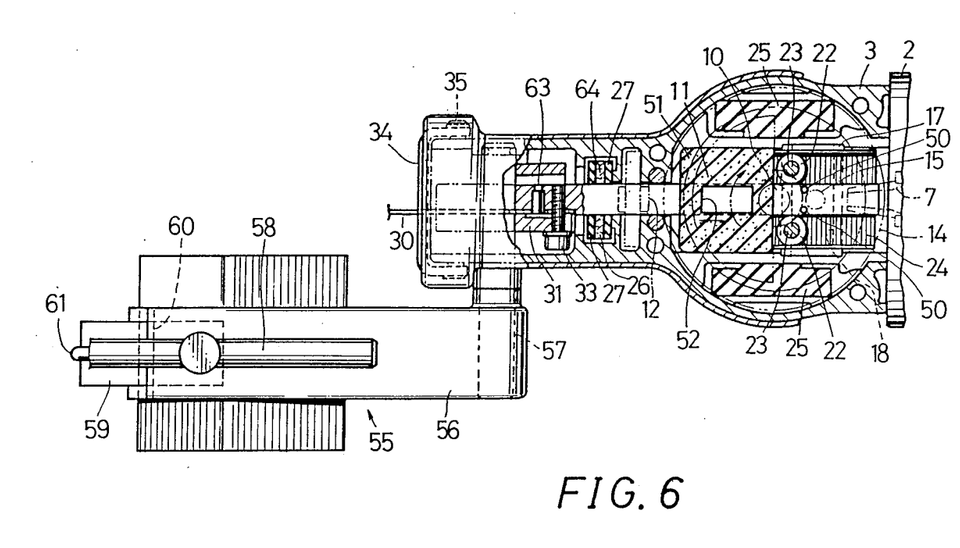
FIG. 6 is a partly sectioned top view of the essential parts of the saw in FIG. 5.

As shown in FIGS. 5 and 6, a pair of oil bores 50 are formed in the rear end of the slider 11 and extends vertically therethrough until they open to the guide groove 18 of the slider block 17. A third lubricant supply member 51 is provided between the first and second guide rollers 12 and 22. The third lubricant supply member 51 is a flat sponge member impregnated with lubricant and fitted in a recess formed in the tool housing 3. The lubricant supply member 51 has a square hole 52 extending therethrough in which lubricant such as grease is filled. Thus, when the slider 11 is moved forward, the oil bores 50 of the slider 11 is adapted to be positioned below the square hole 52 of the lubricant supply member 51 and is supplied with the grease filled in the square hole 52.

Figure 7:
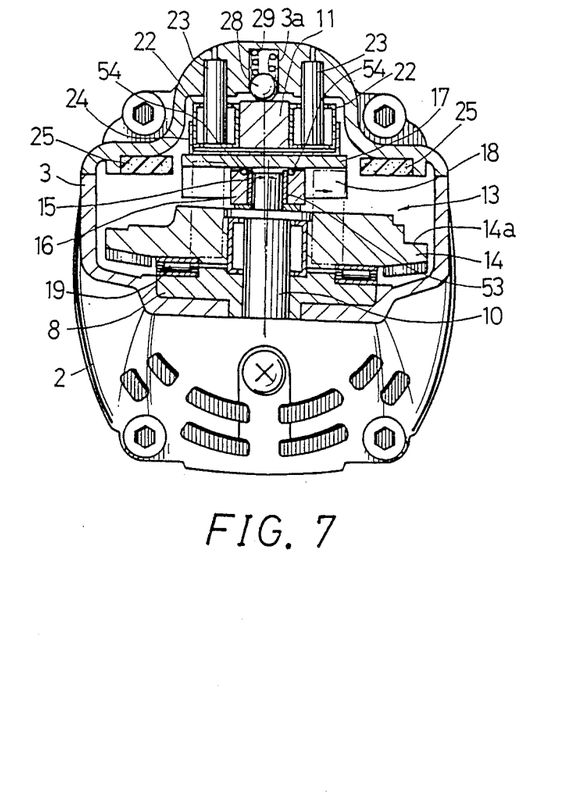
FIG. 7 is a sectional view taken along line VII—VII in FIG. 5.

As shown in FIG. 7, the eccentric pin 15 is fitted in the square bearing metal 16 through a bearing sleeve 53. The bearing metal 16 has a pair of pin rollers 54 mounted thereon adjacent opposite sides of the eccentric pin 15 and adapted to roll on the guide groove 18 of the slider block 17. Thus, the bearing metal 16 may be slided along the guide groove 18 through the pin rollers 54.

Figure 8:
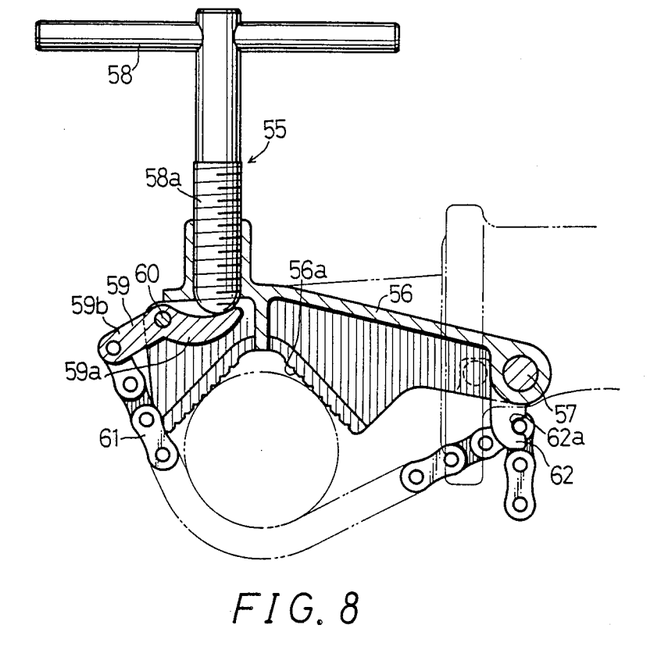
FIG. 8 is a partially sectioned side view of the vice mechanism.

As best shown in FIG. 8, the vice mechanism 55 includes a body 56, a handle 58, a clamp lever 59, a chain-like clamp band 61, and an engaging member 62. The body 56 is supported at the rear end thereof by a support shaft 57 of the tool housing 3 and extends parallel to the saw blade 30. The body 56 is formed on the lower surface of the front end thereof with a substantially inverted V-shaped clamp surface 56a. The handle 58 has a threaded stem 58a which is threadedly engaged with an upper portion of the body 56. The clamp lever 59 is pivotally supported by a pivot pin 60 intermediate the ends thereof and has a curved lever portion 59a engaging the lower surface of the threaded stem 58a to the handle 58 and a connecting lever portion 59b. The clamp band 61 has one end pivotally connected to the connecting lever portion 59b of the clamp lever 59. The engaging member 62 is secured to the lower rear end of the body 56 and has an engaging recess 62a adapted to releasably engage the other end of the clamp band 61. A workpiece can be held between the clamp surface 56a of the body 56 and the clamp band 61. To this end, the clamp band 61 is engaged with the engaging recess 62a of the engaging member 62. The handle 58 is turned to threadedly move the threaded stem 58a engaging the curved lever portion 59a, so that the clamp lever 59 will be pivoted to tighten up the clamp band 61. Thus, the workpiece can be retained fixedly.

Reference numeral 63 designates a positioning pin which corresponds to the positioning screw 32 of the saw blade 30 of the first embodiment, and reference numeral 64 designates a sandwich construction in which the second lubricant supply member 26 of the first embodiment is now interposed between two rubber plates 27.

The effect of the two changes mentioned for the second embodiment will be apparent from the foregoing description. When the slider 11 is moved forward, the oil bores 50 are located below the square hole 52 of the third lubricant supply member 51. The oil bores 50 will then be supplied with the grease filled in the square hole 52 of the lubricant supply member 51, so that the grease may be positively supplied to the sliding surface between the pin rollers 54 and the guide groove 18 of the slider block 17 and to the bearing sleeve 53.

In addition, the two pin rollers 54 on the square bearing metal 16 enables the latter to smoothly slide within the guide groove 18 of the slider block 17.

Further, the chain-like clamp band 61 of the vice mechanism 55 has one end connected to the connecting lever portion 59b of the clamp lever 59 located at the front end of the body 56 and the other end adapted to be engaged with the engaging recess 62a of the engaging member 62 located at the rear end of the body 56. When a workpiece disposed in a direction transverse to the axis of the saw blade 30 is retained, the clamp band 61 is wound over the workpiece from the front side to the rear side thereof. Thus, the operator can conveniently handle the clamp band 61 by only drawing the free end of the clamp band 61 toward him. The work-retaining operation can be performed very simply in the vice mechanism 55.

While the invention has been described with reference to preferred embodiments thereof, it is to be understood that modifications or variations may be easily made without departing from the spirit of this invention which i defined by the appended claims.

What is claimed is:

1. A portable reciprocating saw comprising:
   a tool housing including a front end, a rear end and a pair of opposed longitudinal sides between said front and rear ends;
   an electric motor mounted to said tool housing and having a rotatably driven output shaft;
   a longitudinally elongated slider for supporting a saw blade, said elongated slider extending in a longitudinal direction in said tool housing between said front end and said rear end; and
   motion converting means mounted in said tool housing for converting rotation of the output shaft of said electric motor into a reciprocating motion of said slider in said longitudinal direction, said motion converting means including
   a bevel gear rotatable about a central axis and meshing with said output shaft of said electric motor, said bevel gear axis being inclined laterally toward a side of the housing,
   a slider block mounted on said slider and having a guide groove formed on a lower surface thereof in a direction transverse to the said longitudinal direction of said slider, and
   an eccentric pin mounted on the bevel gear at a position eccentric from the center of said bevel gear and loosely fitted in said guide groove of said slider block;
   whereby, during operation of said electric motor, said slider performs a composite orbital motion including a reciprocating motion in said longitudinal direction and a pivotal motion about a pivot axis extending transverse to said longitudinal direction.

2. The portable reciprocating saw as defined in claim 1 further comprising:
   first guide roller means for mounting said slider intermediate the ends thereof to guide the reciprocating motion of said slider;
   second guide roller means adapted to engage lateral sides of said slider to guide the reciprocating motion and the pivotal motion of said slider; and
   guide ball means engaging the rear end of said slider and adapted to urge the same downwardly.

3. The portable reciprocating saw as defined in claim 1 further comprising:
   a pair of first lubricant supply members formed of sponge and impregnated with lubricant, said pair of first lubricant supply members each being disposed in the rear portion of said tool housing on either side of said slider block in opposing relation to each other; and a second lubricant supply member formed of felt and impregnated with lubricant, said second lubricant supply member being disposed around said slider in the medial portion of said tool housing.

4. The portable reciprocating saw as defined in claim 3 further comprising:
a pair of oil bores formed in the rear end of said slider and opening to said guide groove of said slider block;
a third lubricant supply member formed of flat sponge and impregnated with lubricant, said third lubricant supply member being disposed in an upper portion of said tool housing and having a square hole formed therethrough in confronting relation to said pair of oil bores when said slider is moved forward;
a square bearing metal fitted around said eccentric pin; and
a pair of pin rollers mounted on said bearing metal adjacent opposite sides of said eccentric pin, so that said bearing metal is slidable along said guide groove of said slider block through said pair of pin rollers;
whereby, when said slider is moved forward, said oil bores are positioned below said square hole of said third lubricant supply member so that the lubricant impregnated in said third lubricant supply member is supplied to said oil bores, thus positively supplying the lubricant to the sliding surface between said pin rollers and said guide groove of said slider block and to the fitting portion of said square bearing metal and said eccentric pin.

5. The portable reciprocating saw as defined in claim 1 further comprising a vice mechanism including:
a body pivotally mounted at the rear end thereof to said tool housing and extending parallel to said saw blade, said body being formed on a lower surface of the front end thereof with a substantially inverted V-shaped clamp surface;
a handle having a threaded stem threadedly engaged with an upper portion of said body;
a clamp lever pivotally mounted to said body intermediate the ends thereof, said clamp lever having one end engaged with the lower end of said threaded stem of said handle and the other end formed with an engaging recess; and
a clamp band having one end secured to a rear portion of said body and the other end engageable with said engaging recess of said clamp lever.

6. The portable reciprocating saw as defined in claim 1 further comprising a vice mechanism including:
a body pivotally mounted at the rear end thereof to said tool housing and extending parallel to said saw blade, said body being formed on a lower surface of the front end thereof with a substantially inverted V-shaped clamp surface;
a handle having a threaded stem threadedly engaged with an upper portion of said body;
a clamp lever pivotally mounted to said body intermediate the ends thereof, said clamp lever having a curved lever portion formed on one end thereof and engaged with the lower surface of said threaded stem to said handle and having a connecting lever portion formed on the other end thereof;
a clamp band having one end connected to said connecting lever portion of said clamp lever; and
an engaging member secured to the lower rear end of said body and having an engaging recess releasably engageable with the other end of said clamp band.

7. The portable reciprocating saw as defined in claim 1 including lubricant supply means mounted in said tool housing for supplying lubricant to said guide groove of said slider block.

8. The portable reciprocating saw as defined in claim 7 wherein said lubricate supply means comprises a pair of first lubricant supply members formed of sponge and impregnated with lubricant, said pair of first lubricant supply member each being disposed in the rear portion of said tool housing on either side of said slider block in opposing relation to each other.

9. The portable reciprocating saw as defined in claim 8 further comprising a second lubricant supply member formed of felt and impregnated with lubricant, said second lubricant supply member being disposed around said slider in the medial portion of said tool housing.

10. The portable reciprocating saw as defined in claim 7 wherein said lubricate supply means comprises:
a pair of first lubricant supply members formed of sponge and impregnated with lubricate, said pair of first lubricate supply members each being disposed in the rear portion of said tool housing on either side of said slider block in opposing relation to each other;
a pair of oil bores formed in the rear end of said slider and opening to said guide groove of said slider block; and
a further lubricant supply member formed of flat sponge and impregnated with lubricant , said further lubricant supply member being disposed in an upper portion of said tool housing and. having a square hole formed therethrough in confronting relations of said pair of oil bores when said slider is moved forward;
whereby, when said slider is moved forward, said oil bores are positioned below said square hole of said further lubricant supply member so that the lubricant impregnated in said further lubricant supply member is supplied to said oil bores, thus positively supply the lubricants to said guide groove of said slider block.

11. The portable reciprocating saw as defined in claim 10 further comprising:
a square bearing metal fitted around said eccentric pin; and
a pair of pin rollers mounted on said bearing metal adjacent opposite sides of said eccentric pin, so that said bearing metal is slidable along said guide groove of said slider block through said pair of pin rollers.

12. The portable reciprocating saw as defined in claim 10 further comprising an additional lubricant supply member formed of felt and impregnated with lubricant, said additional lubricant supply member being disposed around said slider in the medial portion of said tool housing.

* * * * *